United States Patent
Jaeh et al.

(10) Patent No.: US 10,192,043 B2
(45) Date of Patent: Jan. 29, 2019

(54) IDENTITY VERIFICATION

(71) Applicant: PROCTORU INC., Livermore, CA (US)

(72) Inventors: Matthew Jaeh, Hoover, AL (US); Jarrod Morgan, Hoover, AL (US); Don Kassner, Livermore, CA (US)

(73) Assignee: ProctorU Inc., Hoover, AL (US)

( * ) Notice: Subject to any disclaimer, the term of this patent is extended or adjusted under 35 U.S.C. 154(b) by 150 days.

(21) Appl. No.: 15/132,932

(22) Filed: Apr. 19, 2016

(65) Prior Publication Data

US 2017/0300679 A1 Oct. 19, 2017

(51) Int. Cl.
*H04L 29/06* (2006.01)
*G06F 21/32* (2013.01)
*G06F 21/31* (2013.01)

(52) U.S. Cl.
CPC ............ *G06F 21/32* (2013.01); *G06F 21/316* (2013.01); *H04L 63/0861* (2013.01)

(58) Field of Classification Search
CPC ..... G06F 21/32; G06F 21/316; H04L 63/0861
See application file for complete search history.

(56) References Cited

U.S. PATENT DOCUMENTS

| | | |
|---|---|---|
| 7,865,439 B2 | 1/2011 | Seifert et al. |
| 8,033,477 B2 | 10/2011 | Jones et al. |
| 8,078,885 B2 | 12/2011 | Jobmann |
| 8,250,097 B2 | 8/2012 | Rhodes |
| 8,510,797 B2 | 8/2013 | Kasturi |
| 8,520,908 B2 | 8/2013 | Bladel et al. |
| 8,572,711 B1 | 10/2013 | Klau |
| 8,582,829 B2 | 11/2013 | Shuster |
| 8,838,970 B1 | 9/2014 | Suresh et al. |
| 8,862,891 B2 | 10/2014 | Geosimonian |

(Continued)

FOREIGN PATENT DOCUMENTS

| | | |
|---|---|---|
| CA | 2474600 C | 9/2009 |
| EP | 2732427 A2 | 5/2014 |

(Continued)

OTHER PUBLICATIONS

Jeffrey Bailie et al. "Online Learner Authentication: Verifying the Identity of Online Users", MERLOT Journal of Online Learning and Teaching, vol. 5, No. 2, Jun. 2009 (9 pages).

(Continued)

*Primary Examiner* — Brandon S Hoffman
*Assistant Examiner* — William A Corum, Jr.
(74) *Attorney, Agent, or Firm* — Squire Patton Boggs (US) LLP

(57) ABSTRACT

Certain embodiments of the invention generally relate to identity verification. A server may include at least one processor, and at least one memory including computer program code. The at least one memory and the computer program code may be configured to, with the at least one processor, cause the server at least to receive a data signal from a user computer for a user request to schedule an enrollment session with a remote live person, send a data signal to the user computer, capture a picture of the user via the webcam, perform a first verification, perform a second verification, perform a third verification, and perform a subsequent identity verification of the user.

20 Claims, 8 Drawing Sheets

(56) References Cited

U.S. PATENT DOCUMENTS

| | | |
|---|---|---|
| 8,959,584 B2 | 2/2015 | Piliouras |
| 8,984,282 B1 | 3/2015 | Kragh |
| 9,083,704 B2 | 7/2015 | Grossemy |
| 2003/0154138 A1 | 8/2003 | Phillips et al. |
| 2008/0293030 A1* | 11/2008 | Hixon ............... G09B 7/00 434/322 |
| 2010/0250390 A1 | 9/2010 | Song et al. |
| 2011/0177484 A1* | 7/2011 | Morgan ............. G09B 7/00 434/322 |
| 2013/0191898 A1 | 7/2013 | Kraft |
| 2013/0198079 A1 | 8/2013 | Mattes et al. |
| 2013/0219480 A1 | 8/2013 | Bud |
| 2014/0212865 A1* | 7/2014 | Morgan ............. G09B 7/00 434/350 |
| 2014/0330689 A1 | 11/2014 | Wong |
| 2015/0052594 A1 | 2/2015 | Liberman et al. |
| 2015/0193651 A1* | 7/2015 | Gleim ............... G06K 9/00295 382/118 |
| 2015/0347734 A1* | 12/2015 | Beigi ............... G06F 21/32 713/155 |
| 2016/0065558 A1* | 3/2016 | Suresh ............. H04L 63/08 726/7 |
| 2017/0308741 A1* | 10/2017 | Gleim ............... G06K 9/00899 |

FOREIGN PATENT DOCUMENTS

| | | |
|---|---|---|
| WO | 2014/151495 A1 | 9/2014 |
| WO | 2014/194939 A1 | 12/2014 |

OTHER PUBLICATIONS

The Learning House, Inc. "Best Practices for Authenticating Student Identity Online", The Online Learning Curve—Best Practices in Online Higher Education, Oct. 10, 2012.

* cited by examiner

IDENTITY VERIFICATION

FIELD OF THE INVENTION

The present invention generally relates to identity verification. More specifically, the present invention relates to methods and systems of identity verification.

BACKGROUND OF THE INVENTION

In certain online transactions, verification of an individual's identity is paramount. Typically, parties related to these transactions have a vested interested in ensuring that users or customers provide information that is associated with the identity of a real person and not an impostor. In the case of online testing and coursework submission, many current identity verification methods fail to address a scenario where a user or consumer engages a proxy to use their identity to perform an online transaction, such as taking an online test or submit coursework online.

Due to the lack of a nationwide unified database for verifying the identity of users, multiple factors of identity authentication methods should be used to increase the certainty of a positive identity match and prevent a proxy from impersonating a user to complete an online test, coursework submission online, or participate in an online classroom. A problem(s) exhibited by conventional products/solutions is that they are in-part or in-whole, integrated into a larger product and cannot reside as a stand-alone solution.

Some of the conventional productions/solutions for identity verification of an online user use various authentication methods. These methods may include asking challenge questions and/or performing keystroke analysis. However, none of the conventional productions/solutions combine these methods with the use of an observed initial enrollment and further comparisons for subsequent or continuous identity verification.

SUMMARY OF THE INVENTION

One embodiment is directed to a server that may include at least one processor, and at least one memory including computer program code. The at least one memory and the computer program code may be configured to, with the at least one processor, cause the server at least to receive a data signal from a user computer for a user request to schedule an enrollment session with a remote live person. The at least one memory and the computer program code may also be configured to, with the at least one processor, cause the server at least to based on the availability of the remote live person and the enrollment session, send a data signal to the user computer, requesting access to at least one of a webcam, microphone, and remote desktop sharing software available on the user computer. The at least one memory and the computer program code may further be configured to, with the at least one processor, cause the server at least to capture a picture of the user via the webcam. The at least one memory and the computer program code may also be configured to, with the at least one processor, cause the server at least to perform a first verification by comparing the user's government issued identification against the captured picture. The at least one memory and the computer program code may further be configured to, with the at least one processor, cause the server at least to perform a second verification by prompting the user to provide answers to a series of knowledge based authentication questions, wherein the user may be observed by a remote person via the webcam. The at least one memory and the computer program code may also be configured to, with the at least one processor, cause the server at least to perform a third verification by recording a keystroke sample entered by the user in response to prompting the user to type a text passage. The at least one memory and the computer program code may further be configured to, with the at least one processor, cause the server at least to perform a subsequent identity verification of the user based on at least one of the captured photo, the user's government issued identification, answers to a series of knowledge based authentication questions, and the user's keystroke sample.

In an embodiment, the at least one memory and the computer program code may further be configured to, with the at least one processor, cause the server at least to validate the government issued identification with a third party identification validation service. In another embodiment, the at least one memory and the computer program code may further configured to, with the at least one processor, cause the server at least to record the user's subsequent authentication validation attempts. In yet another embodiment, the at least one memory and the computer program code may further configured to, with the at least one processor, cause the server at least to send a notification in the event that the enrollment or the subsequent identity verification fails. In another embodiment, the notification may include an email or short message service alert. In another embodiment, the series of knowledge based authentication questions is derived from public records or a third party source. In an embodiment, the at least one memory and the computer program code are further configured to, with the at least one processor, cause the server at least to take and store a new photo of the user for each subsequent identity verification of the user.

Another embodiment is directed to an apparatus. The apparatus may include at least one processor, and at least one memory including computer program code. The at least one memory and the computer program code may be configured, with the at least one processor, to cause the apparatus at least to schedule a user for an enrollment session with a live remote person. The at least one memory and the computer program code may also be configured, with the at least one processor, to cause the apparatus at least to based on the scheduled enrollment session, connect the user to the live remote person via at least one of a webcam, microphone, and remote desktop sharing software. The at least one memory and the computer program code may further be configured, with the at least one processor, to cause the apparatus at least to take a photo of the user via the user's webcam. The at least one memory and the computer program code may also be configured, with the at least one processor, to cause the apparatus at least to perform an initial verification by validating the user's government issued identification with the photo taken of the user. The at least one memory and the computer program code may further be configured, with the at least one processor, to cause the apparatus at least to perform a secondary verification while being observed by the remote person by prompting the user to provide answers to a series of knowledge based authentication questions. The at least one memory and the computer program code may also be configured, with the at least one processor, to cause the apparatus at least to perform a tertiary verification by recording a keystroke sample of the user in response to prompts to the user to type a text passage. The at least one memory and the computer program code may further be configured, with the at least one processor, to cause the apparatus at least to perform a subsequent identity verification of the user based on at least one of the photo of the user, the user's government issued identification, the answers to the series of knowledge based authentication questions, and the user's keystroke sample.

In an embodiment, the at least one memory and the computer program code may further be configured, with the at least one processor, to cause the apparatus at least to validate the government issued identification with a third party identification validation service. In another embodiment, the at least one memory and the computer program code may further configured, with the at least one processor, to cause the apparatus at least to record the user's subsequent authentication validation attempts. In an embodiment, the at least one memory and the computer program code may further configured, with the at least one processor, to cause the apparatus at least to send a notification in the event that the enrollment or the subsequent identity verification fails. In another embodiment, the notification may include an email or short message service alert. In an embodiment, the series of knowledge based authentication questions may be derived from public records or a third party source. In another embodiment, the at least one memory and the computer program code may further be configured, with the at least one processor, to cause the apparatus at least to take and store a new photo of the user for each subsequent identity verification of the user.

Another embodiment is directed to a computer program, embodied on a non-transitory computer readable medium, the computer program, when executed by a processor, may cause the processor to schedule a user for an enrollment session with a live remote person. The computer program, when executed by a processor, may also cause the processor to, based on the scheduled enrollment session, connect the user to the live remote person via at least one of a webcam, microphone, and remote desktop sharing software. The computer program, when executed by a processor, may further cause the processor to take a photo of the user via the user's webcam. The computer program, when executed by a processor, may also cause the processor to perform an initial verification by validating the user's government issued identification with the photo taken of the user. The computer program, when executed by a processor, may further cause the processor to perform a secondary verification while being observed by the remote person by prompting the user to provide answers to a series of knowledge based authentication questions. The computer program, when executed by a processor, may also cause the processor to perform a tertiary verification by recording a keystroke sample of the user in response to prompts to the user to type a text passage. The computer program, when executed by a processor, may further cause the processor to perform a subsequent identity verification of the user based on at least one of the photo of the user, the user's government issued identification, the answers to the series of knowledge based authentication questions, and the user's keystroke sample.

In an embodiment, the computer program, when executed by a processor, may further cause the processor to validate the government issued identification with a third party identification validation service. In another embodiment, the computer program, when executed by a processor, may further cause the processor to record the user's subsequent authentication validation attempts. In an embodiment, the computer program, when executed by a processor, may further cause the processor to send a notification in the event that the enrollment or the subsequent identity verification fails. In another embodiment, the notification may include an email or short message service alert. In an embodiment, the series of knowledge based authentication questions may be derived from public records or a third party source.

Additional features, advantages, and embodiments of the invention are set forth or apparent from consideration of the following detailed description, drawings and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention and are incorporated in and constitute a part of this specification, illustrate preferred embodiments of the invention and together with the detailed description serve to explain the principles of the invention. In the drawings.

DETAILED DESCRIPTION OF THE INVENTION

Figure 1:
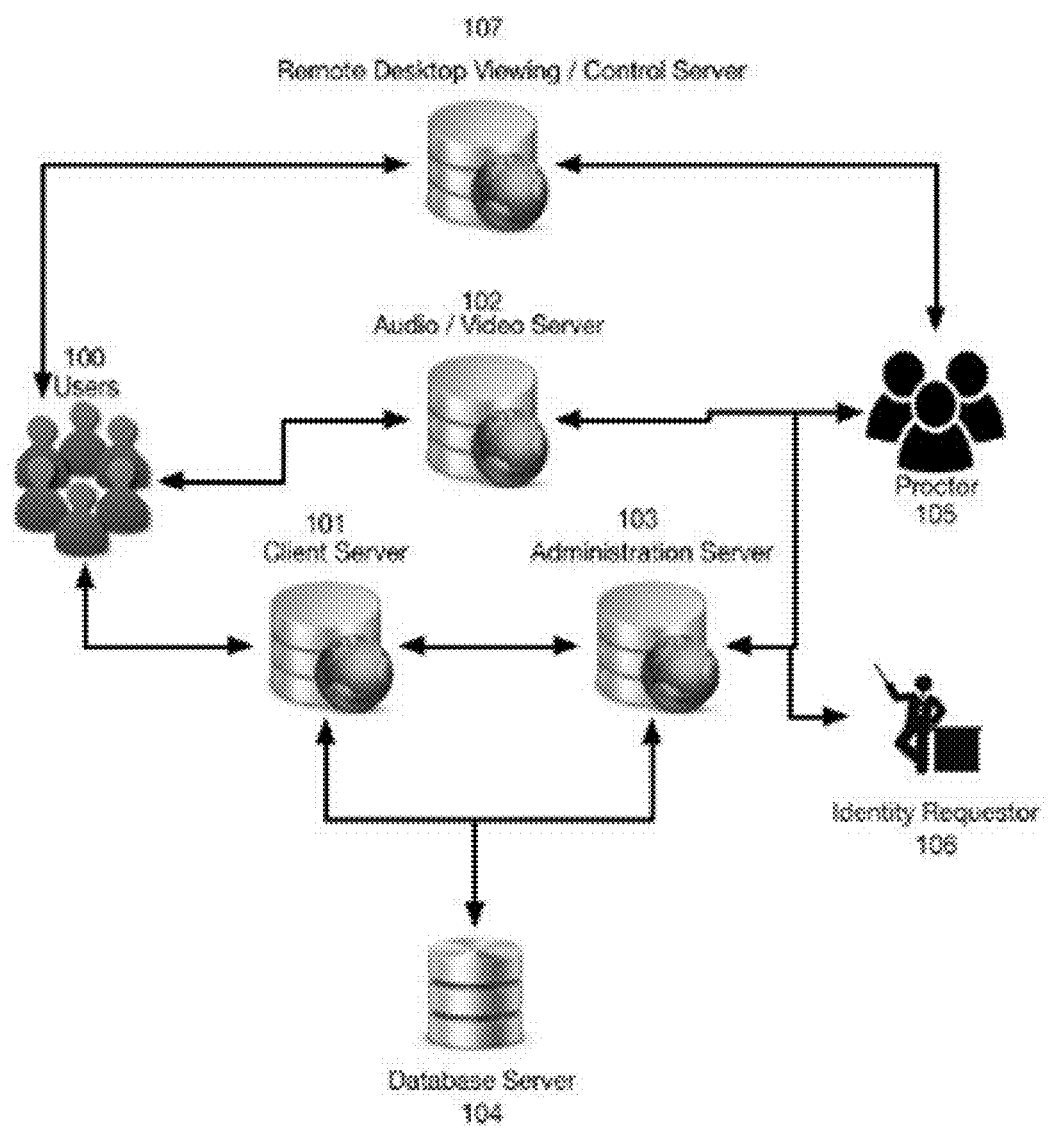
FIG. 1 illustrates an environment for identity verification according to certain embodiments.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention.

Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments. Additionally, if desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

Any combination of one or more computer usable or computer readable medium(s) may be utilized in, with, or in conjunction with components and/or certain embodiments of the invention described herein. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk drive (HDD), a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. A computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out methods of certain embodiments of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart(s) and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart(s) and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart(s) and/or block diagram block or blocks.

According to certain embodiments, it is possible to provide a method, system, and/or apparatus, to prevent a proxy from falsely attending and/or submitting exams online, completing online coursework, and/or documents by establishing a user's initial enrollment with a live person. The information from that initial enrollment may be used to further identify the user during subsequent visits to a website. According to other embodiments, it is possible to prevent fraud. For example, it is possible to prevent financial aid disbursement fraud by ensuring that the identity of the user seeking financial aid is the same as the user participating in the coursework online. In addition, according to some embodiments, it is possible to contribute to the validity of users seeking credentials either in education or professional testing. In certain embodiments, live identity verification may be used to virtualize other instances where the user would otherwise be required to travel to a physical location such as notary services, license renewals, or document and signature or submissions.

The observed establishment of the initial enrollment may contain many different authentication methods, and the information that may be stored on the user could range from a variety of data. In certain embodiments, such data may include, but not limited to, one or more, or a combination of the following: photograph; pass/fail results from public records based challenge questions; acknowledgement of government issued identification (ID), which may include validation of authenticity in some cases; keystroke sample; knuckle sample; iris sample; palm vein sample; facial feature sample; voice sample; and fingerprint. In other embodiments, the party who is requesting the user's identity verification may use the stored enrollment information and compare it to future samples for verification of the user's identity prior to taking an exam, submitting coursework, submitting documents, validating attendance, or other like actions.

FIG. 1 illustrates an environment for identity verification, according to certain embodiments. In the identity verification environment shown in FIG. 1, there are users 100 that may connect to an audio/video server 102 and interact with a remote person. In an embodiment, the remote person may be a proctor 105 on any type of device that includes a camera and/or microphone capable of being broadcast over the Internet. In some embodiments, more than one proctor 105 may be available.

The proctor 105 may interact with the audio/video server 102, the administration server 103, a remote desktop viewing/sharing/control server 107, and the users 100 on any device that includes a camera and/or microphone capable of being broadcast over the Internet. The identity verification environment also includes an identity requestor 106, which may interact with the administration server 103 using any device capable of connected to the Internet. Also present in the identity verification environment is a database server 104 that may be accessible to only the client server 101 and the administration server 103.

The remote desktop viewing/control server 107 of the identity verification environment may be any system or process that can facilitate screen sharing (viewing/control) of the users' 100 device over the Internet. In an embodiment, the audio/video server 102 may be any system or process that can facilitate recorded 2-way communications between the users 100 and the proctors 105.

According to certain embodiments, the client server 101 and the administration server 103 may exist as separate or clustered machines, but may be run from a single machine. The client server 101 may be configured to host the platform that is capable of delivering many configurable authentication methods. The client server 101 may also include an account creation interface and the ability to schedule or take on demands of initial enrollment. Further, the administration server 103 may be configured to host the proctors 105 and the identity requestor 106 configuration, reporting, administrative functionality, and interfaces.

In certain embodiments, upon signing up for an initial enrollment, the client server 101 may connect the user to a live remote person, using webcam, microphone, and remote desktop sharing software. In some embodiments, the live remote person may be a proctor, whereas in other embodiments the live remote person can be any other person other than a proctor. After the client server 101 helps establish an audio/video and remote desktop sharing connection with the user, the remote person may use the client server 101 to take a photo of the user via the user's webcam. This may be accomplished by the client server 101 first receiving a data signal from the user computer for a user request to schedule an enrollment session with a remote live person. Then, based on the validity of the remote live person and the enrollment session, send a data signal to the user computer requesting access to at least one of a webcam, microphone, and remote desktop sharing software available on the user computer.

Figure 2:
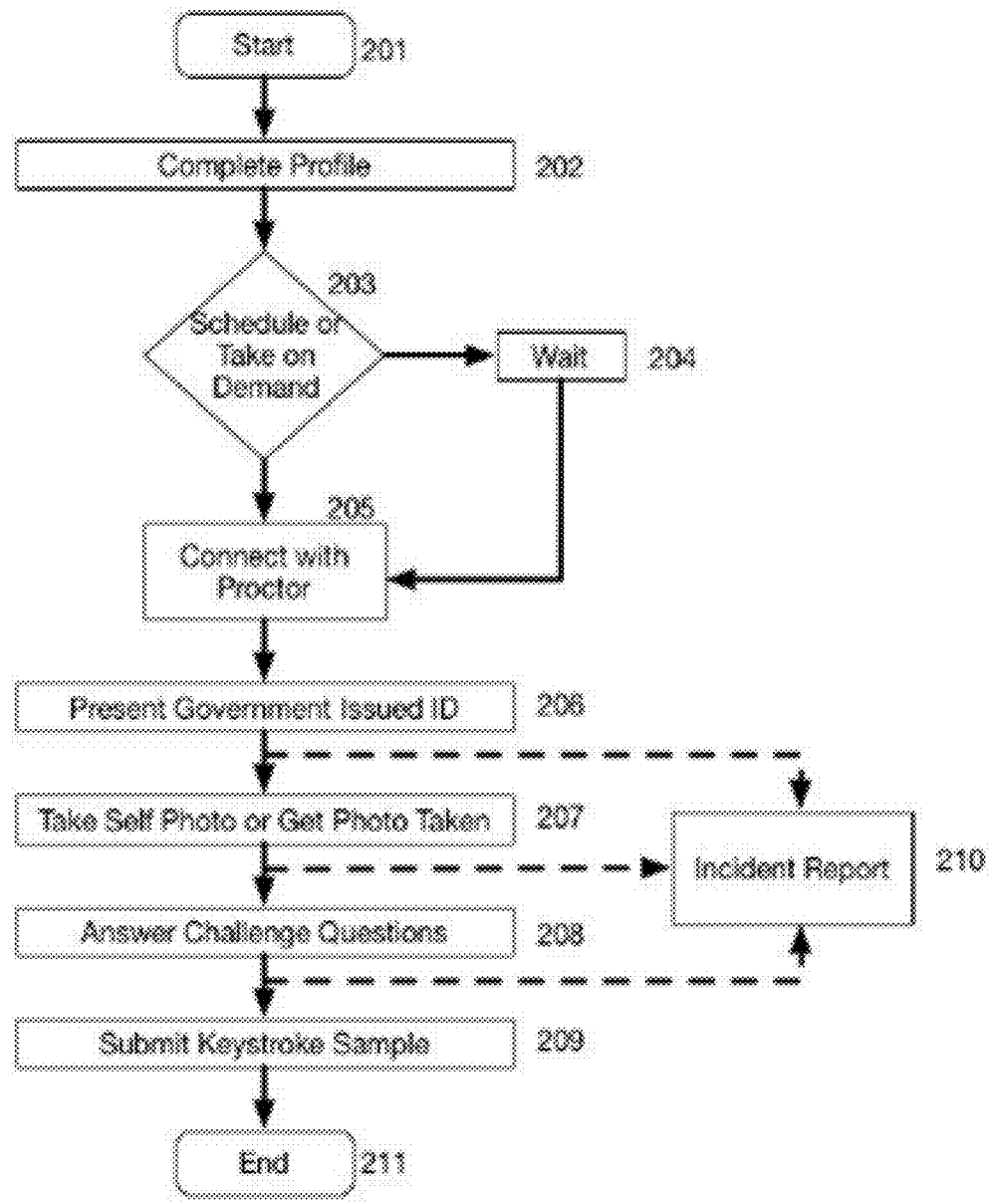
FIG. 2 illustrates a flow diagram relating to user enrollment according to certain embodiments.

FIG. 2 illustrates a flow diagram relating to user enrollment, according to certain embodiments. As shown in FIG. 2, the user enrollment process begins at 201, where the user starts by clicking a link from a location. The location, according to certain embodiments, may include a website, email, or application. At 202, the link may take the user to complete a user profile. The user profile may include various fields including the user's name, account information, local time zone, valid contact information, the institution where the user is associated, a photo of the user, and an option to enable enhanced accessibility.

After successful completion of the user profile, the user may have the option to schedule an initial enrollment or take it on demand 203. If the user decides to schedule an initial enrollment, the process proceeds to a waiting period 204 in which the user may schedule the initial enrollment. During the scheduling process, and depending on what the institution or identity requester 106 has specified, the user may be prompted to pay for the session.

At 205, the user may connect to the proctor 105, depending on whether the user opted to take the initial enrollment on demand, or schedule it for a later date and time. At 206, prior to the user being sent to the page to connect to the proctor, the user may be prompted to present the user's government issued ID, and at 207, take a self-photo. At 208, the user may be prompted to answer several challenge questions, and at 209, may also be prompted to submit a keystroke sample for verifying the user's identity. If a failure at any one of steps 206, 207, and 208 is detected, an incident report 210 may be generated for the identity requestor's 105 review. After steps 206, 207, 208, and 209 have been completed, the user may connect to the proctor 105 via both the remote desktop viewing/control server 107, and the audio/video server 102.

Once connected to the proctor 105, the proctor 105 may verify the user's government issued ID and compare the photo the user took with the person who is present via the audio/video 2-way communication session. If those two comparisons match, then the proctor 105 may unlock one or multiple authentication methods. The authentication methods may include, but are not limited to, for example, public records, knowledge base challenge questions, and/or submitting a keystroke sample. At any time, depending on the thresholds set by the institution, the identity requestor 106 or industry best practices, the user may fail one or all of the authentication methods. In the event that this occurs, the system may create an incident report for the identity requestor 106 to review. If the enrollment process passes, then the user may disconnect from the proctor 105, and the enrollment process may be concluded. The proctor 105 may then indicate in the administration server 103 that the enrollment has been successful and a digital representation of the user's identity may be created. In certain embodiments, the initial enrollment of the user may establish the identity of the user for all subsequent interactions.

Figure 3:
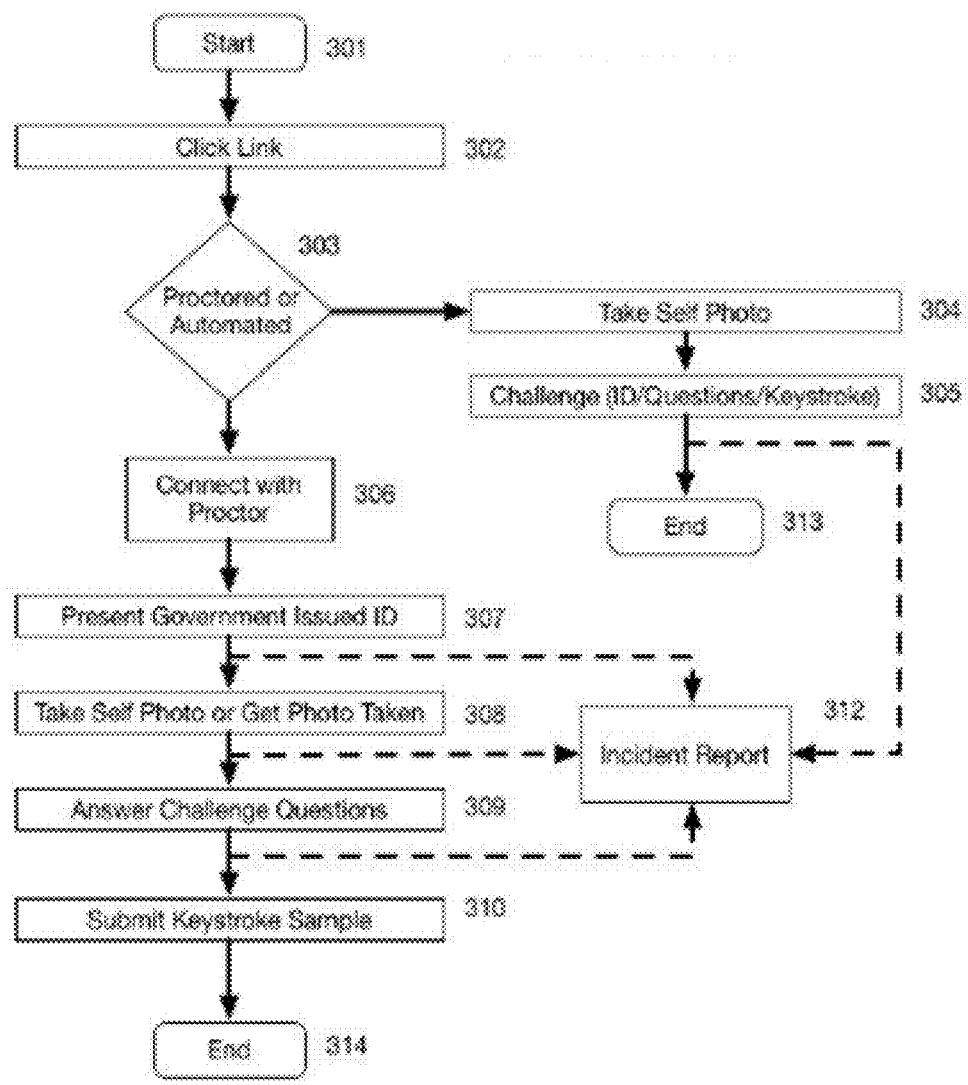
FIG. 3 illustrates a flow diagram relating to a process of user follow-up according to certain embodiments.

FIG. 3 illustrates a flow diagram relating to a process of user follow-up, according to certain embodiments. In FIG. 3, depending on how the institution or identity requestor 106 configured the system, the user may be prompted to follow-up identity verifications that may be with a proctor 105 or completely automated 303. In either case, the user may arrive via a link 302 from scheduling a proctored exam or the user's institution portal, assignment, or system 301. At 304, if the follow-up is going to be automated, then the user may be prompted to take a self-photo. Then, at 305, the user may be presented with an identification challenge(s), such as, for example, a submission to a keystroke sample. The system may compare the results from the challenge(s) and indicate if the passed or failed based on thresholds defined by the institution, identity requestor 106, or industry best practices. In the event that the user fails, an incident report 312 is created for the identity requestor 106 to review. Otherwise, if the user passes the challenge(s), the follow-up process ends at 313.

Depending on how the threshold for pass/fail is set, the user may either be permitted to continue on to the next task (taking an exam, submitting an assignment, submission of documents, or any other similar or related tasks), or in the case of failure, the user might be barred from proceeding further until the identity requestor reviews the incident report 312. If the follow-up process is going to be proctored 303, then the user may be connected to the proctor 105, at 306 via both the remote desktop viewing/control server 107 and the audio/video server 102. After connecting to the proctor 105, the user may be prompted to present a government issued ID 307 and take a self-photo 308. The proctor may then verify the user's government issued ID and compare the photo the user took with the person who is present via the audio/video 2-way communication session. If those two comparisons match, then the proctor 105 may unlock one or multiple authentication methods that may include public records knowledge base challenge questions 309, and/or submit to a keystroke sample 310.

At any time, depending on the thresholds set by the institution, identity requestor or industry best practices, the user may fail one or all of the authentication methods. In the event this occurs, the system may create an incident report 312 for the identity requestor 106 to review. If the follow-up process passes, then the follow-up process is concluded at 312. The proctor may indicate in the administration server 103 that the follow-up has been successful and then help the user with the next part of the process which may be taking an exam, filling out online documents, and other tasks.

According to certain embodiments, the user follow-up process may create a user activity timeline using the initial enrollment as the beginning, and all the subsequent follow-ups as points along the line. This timeline may help the institution or identity requestor 106 to establish confidence that the same user was present during all the points in a given process.

Figure 4:
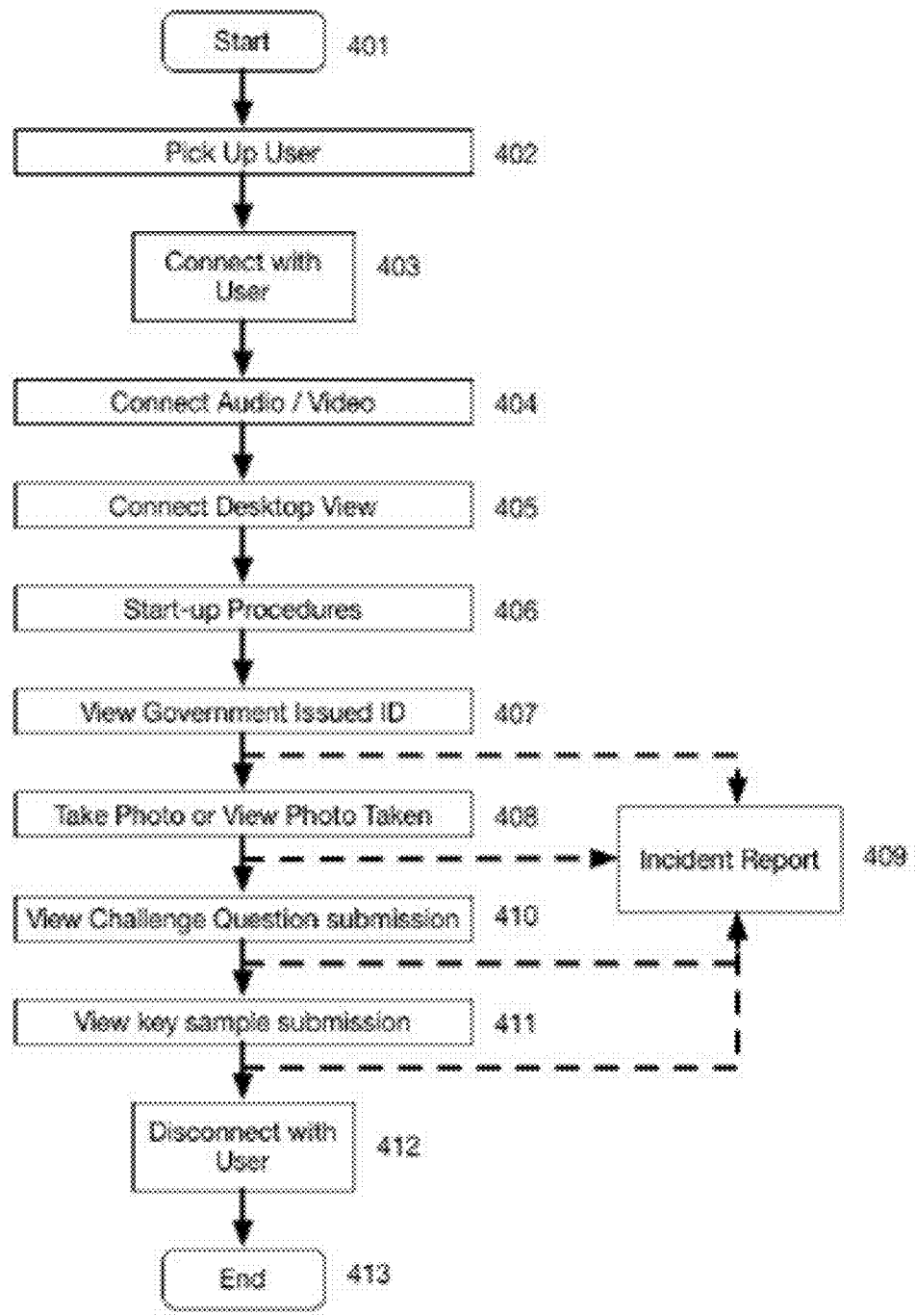
FIG. 4 illustrates a flow diagram relating to a process of proctor workflow according to certain embodiments.

FIG. 4 illustrates a flow diagram relating to a process of proctor workflow, according to certain embodiments. In the proctor workflow, the proctor 105 may use the administrative server 103 to locate the user session. Once the user session has been located, the start process may begin at 401 to pick up the user at 402, and initiate the connection with the user at 403. At 404, the connection with the user may be established via the audio/video server 102. The connection with the user may also be established, at 405, via the remote desktop viewing/control server 107. After the connection is established, the proctor 105 may begin start-up procedures at 406. In certain embodiments, the start-up procedures may include viewing a government issued ID 407, taking or verifying a photo of the user 408, and/or administering identity authentication challenges, such as challenge questions 410 and keystroke analysis 411.

In the event that the user fails an identity authentication challenge or aberrant behavior is detected, the proctor 105 may create an incident report 409 that may be delivered to the identity verification requestor 106. Otherwise, at 412, the proctor 105 may disconnect with the user, and conclude the session at 413.

Figure 5:
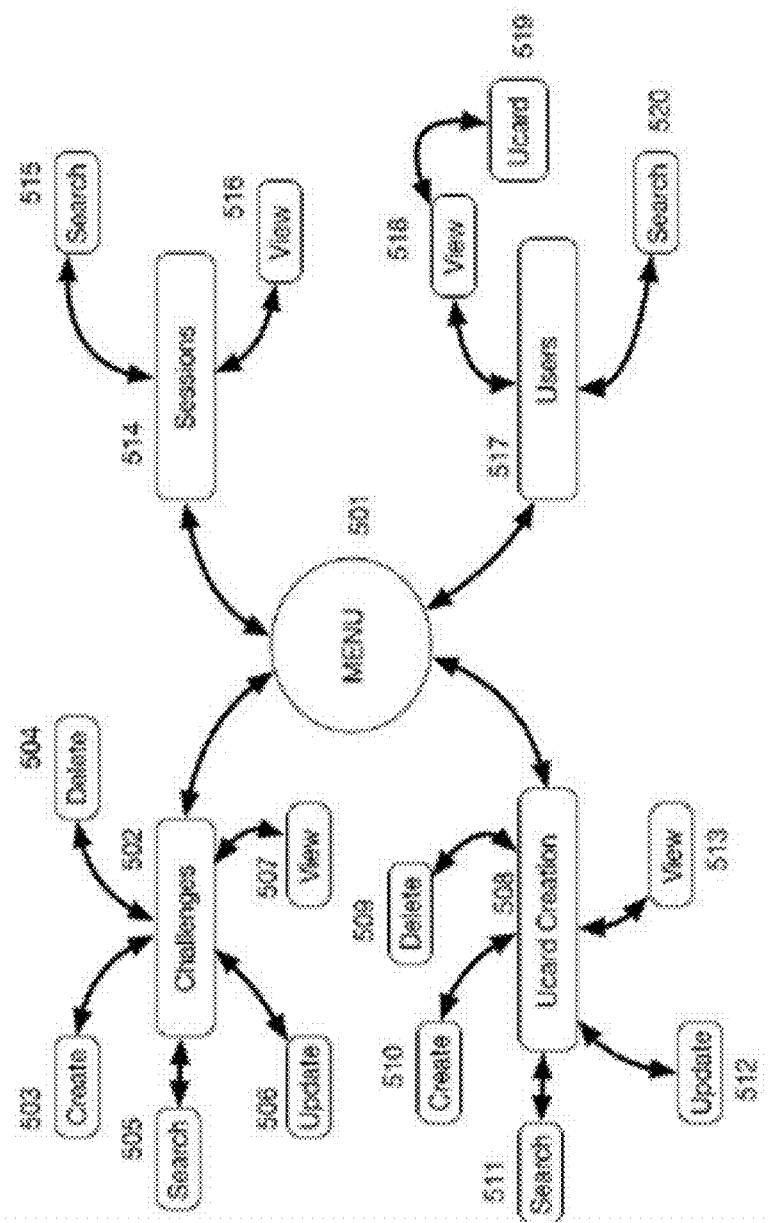
FIG. 5 illustrates a flow diagram relating to administrator workflow according to certain embodiments.

FIG. 5 illustrates a flow diagram relating to administrator workflow, according to certain embodiments. The administrator may log onto the administration server 103 and begin by interacting with a menu 501. The menu may have four options. The first option is challenges 502. The challenges are locations in the administration server 103 where the administrator may create 503, delete 504, search 505, update 506, or view 507 various challenges. The challenges may be the embodiment of various authentication methods that may be used to identify a user. The challenges may be modified and customized to meet the needs of the identity verification requestor 106 or administrator.

The second menu option is sessions 514. The sessions section may include the ability to search 515, and view 516. For instance, in certain embodiments, the sessions may include enrollments and follow-up challenge sessions. The sessions section may be a comprehensive reporting area that may be used to display all the sessions that occurred with all users for a given institution. The third menu option is a users 517 section where the administrator may view 518 and search 520 for user profiles as well as view the embodiment of the inventions identification 519 or Ucard. In certain embodiments, the inventions identification 519 or Ucard may correspond to a logical embodiment that summarizes enrollment. The summary may include information such as a photo of the user, the user's name, the date that the identification was created, the originating institution, user email address, and verifications performed. Lastly, the fourth menu option is a Ucard creation 508. The Ucard creation section enables the administrator to delete 509, create 510, search 511, update 512, and view 513 the initial Ucard enrollment as the sessions.

In certain embodiments, the administrative server 103 may be configured to support many different types of authentication methodologies. For example, new methods may be added, depending on their configuration. Further, existing authentication methods may be modified or re-configured.

According to certain embodiments, an account may be created for the user. In creating the account, the user may be required to input the user's first and last name, and also input account information. In an embodiment, the account information may include a username, the user's email address, desired password, and/or password confirmation. When creating the account, the user may also be required to specify the user's local time zone, and the user's contact information. In an embodiment, the user's contact information may include the user's mobile phone number, home phone number, and/or work phone number. The user may further be required to specify the institution(s) that the user is associated with, provide a self-photo, and enable enhanced readability.

After the user completes the user profile, and after enabling the online identity verification system, the user may be able to create an ID card associated with the user. The ID card may help the user schedule the user's initial enrollment session. When creating the ID card, the user may receive a prompt message that explains to the user that the user must verify the user's identity before taking any ID card authentication challenges. The user may then have the option of closing or terminating the session, or proceeding in scheduling a session. If the user decides to close the session, then the user will be directed back to the home page. However, if the user decides to schedule a session, the user will be presented with scheduling options to select a date and time.

In certain embodiments, as the user schedules an initial identity verification session, the user may select a date and a specific time. A list of available dates and times may then be populated for the user based on the user's selection of the date and time. The user may then select the desired date and time, and then confirm the date and time that the user has selected.

In some embodiments, the system may be flexible in terms of payments where the user can pay for the initial session or the institution can pay for it. The user may be presented with an option to edit the user's selected appointment to a different date and/or time, or cancel the transaction entirely. If the user decides to proceed, the user may enter payment and complete the transaction.

According to certain embodiments, after the user has scheduled an appointment for the initial identity verification enrollment, the user may have the option to reschedule if the time that the user had previously selected is no longer convenient, or if the user feels the need to take it earlier than originally scheduled, the user may use a "Take it Now" feature for on-demand connection.

In certain embodiments, a proctor may be presented with a "Flight Path" that is designed to help guide the user through a step-by-step identity verification enrollment process. The proctor may also have the ability to "Escalate" the session if an abnormality or something out of the ordinary occurs. In some embodiments, the ability to escalate a session may include performing a deeper review or analysis in the event that the enrollee fails certain steps in the enrollment process, but attests to their identity. The proctor may further have the ability to cancel the session if the user wishes to reschedule or cannot complete the enrollment. In other embodiments, if new authentication methods are desired, the administrator user of the administrator server may have the ability to add new authentication methods to be used in the online identification system.

In some embodiments, the proctor may have the ability to notate details of the session in free text. In certain embodiments, details of the session may include details of the enrollment session or a live-follow-up session in the verification or proctoring process. In the event something abnormal occurs, the proctor may flag the note as part of the incident process. In such a situation, all activities that are performed by the user or proctor may be displayed in an activity timeline. Further, any authentication method used during the process may display the attempts at authentication by the user and status/score of the authentication method.

According to certain embodiments, during a live enrollment process, the proctor may check the user's government issued photo ID for validity. During the live enrollment process, either the system or the proctor may take a photo of the user. In addition, during the live enrollment process, the system or the proctor may administer a series of knowledge based challenge questions for the user to complete. Upon answering all of the questions, the proctor may continue with the live enrollment process. Furthermore, during the live enrollment process, either the system or the proctor may administer a keystroke challenge for the user to submit an initial sample. The proctor may observe the user while the user is performing the keystroke challenge. Once the keystroke challenge has been completed, the proctor may indicate/confirm that the challenge has been completed.

In certain embodiments, the administrator may have the option to see all of the challenges that they have created, view completed sessions (including initial session and follow-ups), view all the users who have participated in the online identity verification, and review the configuration for the initial enrollment session. In an embodiment, the configuration for the initial enrollment session may include an indication of the number of Ucards that have been created. In addition, the administrator user may have the ability to search for challenges that they have created, and to reset the search if needed. Further, the challenges may also be modified, and the challenge link may be automatically copied to the administrator users.

In some embodiments, the administrator may have the ability to search for sessions or reset the search if desired. The session search results may display the type of challenge, the user, dates on completion, which verifications were performed, the scores, and the status of the authentication process. In other embodiments, the administrator may have the ability to search for users or reset the search if desired. The user search results may display the user name and user photo, dates on completion, and total sessions. In certain embodiments, the dates on completion may include the ability to search, view, or sort based on when the challenges were completed, and the total sessions may include initial and/or follow-ups.

According to certain embodiments, the administrator may see the digital embodiment of the users' online identification. This may include the users' photo, the date that the online identification was created, the originating institution, the users' email address, and the different types of verifications performed. In certain embodiments, various data items concerning the authentication process may be displayed to the user. For example, in some embodiments, a user photo, session name, complete date, verification/score, and the number of attempts may be displayed to the user.

In some embodiments, creation of an identity verification challenge may require a few items such as the name, the department, term, and contact information. Once the information for the identity verification challenge has been obtained, the administrator user may submit them for review. The administrator user may customize the keystroke initial sample. Further, the administrator user may create availability enrollment windows where the users must use the challenges during the specified windows of time. Once it is the user's time to connect with the proctor, the user may be asked to confirm the user's name, and why the user is connecting with the proctor.

According to certain embodiments, the system may ask the user to display the user's government issued identification to the camera for verification. The user may also have the ability to skip this step if the user feels uncomfortable with displaying the user's government issued identification to the camera. In addition, the system may take the user to take a self-photo. After a self-photo has been taken, the user may have the option of submitting the photo, or take a different photo.

In some embodiments, once a self-photo has been taken, the user may be able to begin the process of connecting to a live proctor for the initial enrollment. During this process the user may download a file, the execution of which, initiates the connection to the proctor. In certain embodiments, the downloaded file may pertain to a screensharing or viewing part of the enrollment process. The user may also have the ability to adjust camera and volume settings once connected to the proctor. After the proctor has connected with the user, the proctor may unlock the authentication verifications used in the authentication process. In certain embodiments, the verifications may include challenge questions and/or a keystroke verification. For keystroke verification, the user may be required to type a short passage, and then submit the passage once the user has completed typing the short passage.

In certain embodiments, the users' verifications may be organized and presented in a timeline. The proctor or administrator user may see in a timeline, when a user has successfully completed their verifications. In the timeline, the proctor or administrator user may also have the ability to view the self-photo taken by the user, and the picture of the government issued photo identification if it still resides on the server, prior to automatic deletion.

According to certain embodiments, the system may include an online identity verification follow-up challenge in which the user is presented with a prompt to take another self-photo after visiting a link that was created by the administrator user from the administration server. Once another self-photo has been taken, the user may submit the photo to verifications. The user may then be prompted to read additional instructions, and see what verifications the user will need to perform. Once the user is ready, the user may begin the follow-up authentication process.

In certain embodiments, after the user has begun the follow-up authentication, the user may be required to submit a keystroke verification and to type a short paragraph. The user may be presented with what verifications the user needs to perform, and may be presented with specific instructions on what needs to be performed. After the user has successfully submitted the keystroke sample, the system may inform the user whether the user has passed or failed, and confirm that the authentication has been completed. However, if there are more authentication verifications, then the user may proceed to the next authentication. In certain embodiments, additional authentications may include verifying the user's answers to a series of knowledge based authentication questions.

Figure 6:
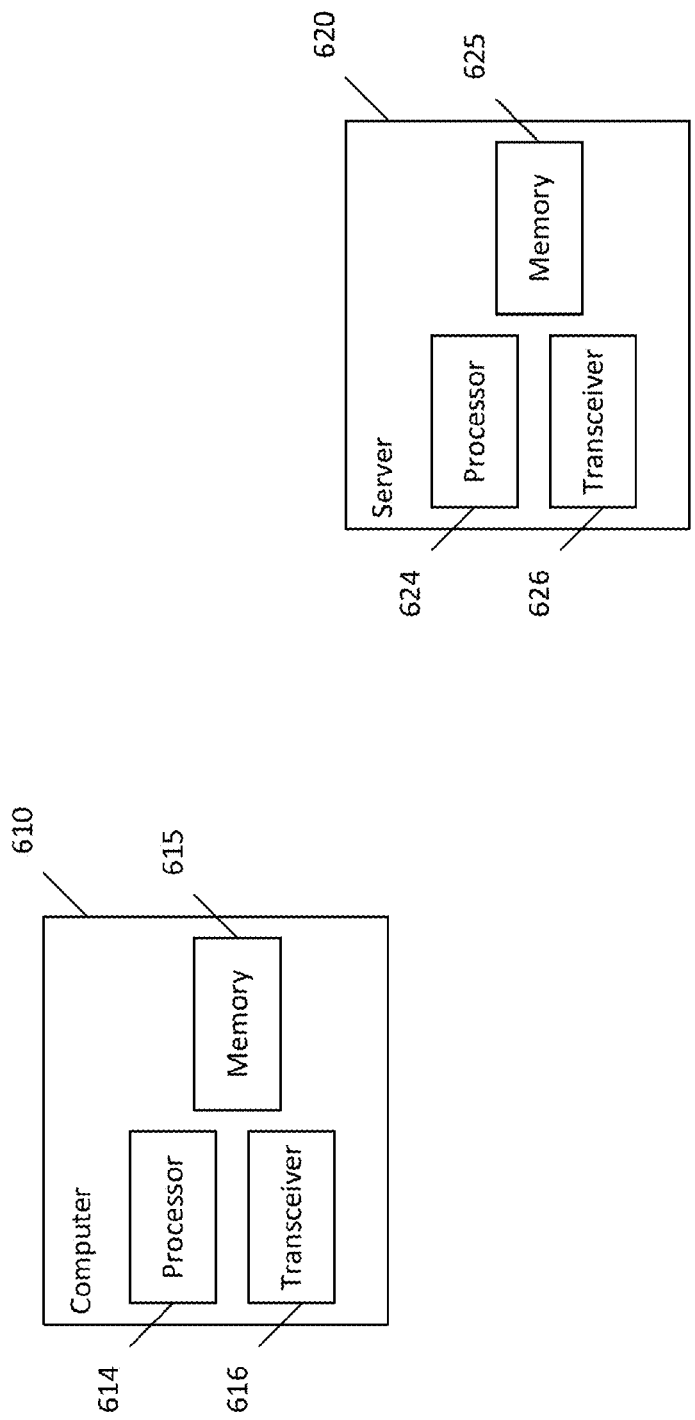
FIG. 6 shows an exemplary system, according to one embodiment.

FIG. 6 illustrates an example of a system according to certain embodiments. It should be understood that each block of the flow diagrams of FIGS. 1-5, 7, and 8, or any combination thereof, may be implemented by various means or their combinations, such as hardware, software, firmware, one or more processors and/or circuitry. In one embodiment, a system may include multiple devices, such as, for example, at an apparatus 610 and a server 620. The system may include more than one apparatus 610 and more than one server 620, although only one apparatus 610 and one server 620 are shown for the purposes of illustration.

The apparatus 610 can be any computing device or a user computer associated with users 100 that can take the form of a traditional server/desktop/laptop; mobile device such as a smartphone or tablet; etc. Computing devices may typically include one or more processors coupled to data storage for computer program modules and data. Key technologies include, but are not limited to, the multi-industry standards of Microsoft and Linux/Unix based Operation Systems; databases such as SQL Server, Oracle, NOSQL, and DB2; Business analytic/Intelligence tools such as SPSS, Cognos, SAS, etc.; development tools such as Java, NET framework (VB.NET, ASP.NET, AJAX.NET, etc.); and other e-Commerce products, computer languages, and development tools. Such program modules generally include computer program instructions such as routines, programs, objects, components, etc., for execution by the one or more processors to perform particular tasks, utilize data, data structures, and/or implement particular abstract data types. While the systems, methods, and apparatus are described in the foregoing context, acts and operations described hereinafter may also be implemented in hardware.

In certain embodiments, the server 620 may be a node, host, or server in a network. For example, the server 620 may be a remote desktop viewing/control server, an audio/video server, a client server, an administration server, a database server, or other similar type servers.

Each of these devices may include at least one processor, respectively indicated as 614 and 624 for processing information and executing instructions or operation. Processors 614 and 624 may be any type of general or specific purpose processors. While a single processor 614 and 624 is shown for each device in FIG. 6, multiple processors may be utilized in each device according to other embodiments. In fact, processors 614 and 624 may include one or more general-purpose computers, special purpose computers, microprocessors, central processing units (CPU), digital signal processors (DSPs), field-programmable gate arrays (FPGAs), application-specific integrated circuits (ASICs), and processors based on a multi-core processor architecture, as examples, or other comparable devices. The processors 614 and 624 can be implemented as a single controller, or a plurality of controllers or processors.

At least one memory (internal or external) can be provided in each device, and indicated as 615 and 625, respectively. The memory may include computer program instructions or computer code contained therein. The processors 614 and 624 and memories 615 and 625, or a subset thereof, can be configured to provide means corresponding to the various blocks and processes shown in FIGS. 1-5, 7, and 8.

Memories 615 and 625 can independently be any suitable storage device, such as a non-transitory computer-readable medium. A hard disk drive (HDD), random access memory (RAM), flash memory, or other suitable memory can be used. The memories can be combined on a single integrated circuit as the processor, or may be separate from the one or more processors. Furthermore, the computer program instructions stored in the memory and which may be processed by the processors can be any suitable form of computer program code, for example, a compiled or interpreted computer program written in any suitable programming language.

The memory and the computer instructions can be configured, with the processor for each device, to cause a hardware apparatus such as apparatus 610 and server 620 to perform any of the processes described herein (see, for example, FIGS. 1-5, 7, and 8). Therefore, in certain embodiments, a non-transitory computer-readable medium can be encoded with computer instructions that, when executed in hardware, perform a process such as one of the processed described herein. Accordingly, in certain embodiments, a non-transitory computer-readable medium can be encoded with computer instructions that, when executed in hardware, perform a process such as one of the processes described herein. Alternatively, certain embodiments of the invention can be performed entirely in hardware.

According to certain embodiments, the server 620 may include at least one processor 624 and at least one memory 625 including computer program code. The at least one memory 625 and the computer program code may be configured, with the at least one processor 624, to cause the server 620 at least to receive a data signal from a user computer for a user request to schedule an enrollment session with a remote live person. The at least one memory 625 and the computer program code may also be configured, with the at least one processor 624, to cause the server 620 at least to, based on the availability of the remote live person and the enrollment session, send a data signal to the user computer, requesting access to at least one of a webcam, microphone, and remote desktop sharing software available on the user computer. The at least one memory 625 and the computer program code may also be configured, with the at least one processor 624, to cause the server 620 at least to capture a picture of the user via the webcam.

The at least one memory 625 and the computer program code may also be configured, with the at least one processor 624, to cause the server 620 at least to perform a first verification by comparing the user's government issued identification against the captured picture. The at least one memory 625 and the computer program code may also be configured, with the at least one processor 624, to cause the server 620 at least to perform a second verification by prompting the user to provide answers to a series of knowledge based authentication questions, wherein the user is observed by a remote person via the webcam. The at least one memory 625 and the computer program code may also be configured, with the at least one processor 624, to cause the server 620 at least to perform a third verification by recording a keystroke sample entered by the user in response to prompting the user to type a text passage. The at least one memory 625 and the computer program code may also be configured, with the at least one processor 624, to cause the server 620 at least to perform a subsequent identity verification of the user based on at least one of the captured photo, the user's government issued identification, answers to a series of knowledge based authentication questions, and the user's keystroke sample.

A server 620, in certain embodiments, may include means for receiving a data signal from a user computer for a user request to schedule an enrollment session with a remote live person. The server 620 may also include means for, based on the availability of the remote live person and the enrollment session, sending a data signal to the user computer, requesting access to at least one of a webcam, microphone, and remote desktop sharing software available on the user computer. The server 620 may further include means for capturing a picture of the user via the webcam. The server 620 may also include means for performing a first verification by comparing the user's government issued identification against the captured picture. The server 620 may further include means for performing a second verification by prompting the user to provide answers to a series of knowledge based authentication questions, wherein the user is observed by a remote person via the webcam. The server 620 may also include means for performing a third verification by recording a keystroke sample entered by the user in response to prompting the user to type a text passage. The server 620 may further include means for performing a subsequent identity verification of the user based on at least one of the captured photo, the user's government issued identification, answers to a series of knowledge based authentication questions, and the user's keystroke sample.

According to certain embodiments, a server 620 may include at least one memory 625 including computer program code, and at least one processor 624. The at least one memory 625 and the computer program code may be configured, with the at least one processor 624, to cause the server 620 at least to schedule a user for an enrollment session with a live remote person. The at least one memory 625 and the computer program code may also be configured, with the at least one processor 624, to cause the server 620 at least to, based on the scheduled enrollment session, connect the user to the live remote person via at least one of a webcam, microphone, and remote desktop sharing software. The at least one memory 625 and the computer program code may also be configured, with the at least one processor 624, to cause the server 620 at least to take a photo of the user via the user's webcam. The at least one memory 625 and the computer program code may also be configured, with the at least one processor 624, to perform an initial verification by validating the user's government issued identification with the photo taken of the user. The at least one memory 625 and the computer program code may also be configured, with the at least one processor 624, to perform a secondary verification while being observed by the remote person by prompting the user to provide answers to a series of knowledge based authentication questions. The at least one memory 625 and the computer program code may also be configured, with the at least one processor 624, to perform a tertiary verification by recording a keystroke sample of the user in response to prompts to the user to type a text passage. The at least one memory 625 and the computer program code may also be configured, with the at least one processor 624, to perform a subsequent identity verification of the user based on at least one of the photo of the user, the user's government issued identification, the answers to the series of knowledge based authentication questions, and the user's keystroke sample.

A server 620, in certain embodiments, may include means for scheduling a user for an enrollment session with a live remote person. The server 620 may also include means for, based on the scheduled enrollment session, connecting the user to the live remote person via at least one of a webcam, microphone, and remote desktop sharing software. The server 620 may further include means for taking a photo of the user via the user's webcam. The server 620 may also include means for performing an initial verification by validating the user's government issued identification with the photo taken of the user. The server 620 may further include means for performing a secondary verification while being observed by the remote person by prompting the user to provide answers to a series of knowledge based authentication questions. The server 620 may also include means for performing a tertiary verification by recording a keystroke sample of the user in response to prompts to the user to type a text passage. The server 620 may further include means for performing a subsequent identity verification of the user based on at least one of the photo of the user, the user's government issued identification, the answers to the series of knowledge based authentication questions, and the user's keystroke sample.

As shown in FIG. 6, transceivers 616 and 626 can be provided. Other configurations of these devices, for example, may be provided as well.

Transceivers 616 and 626 can each, independently, be a transmitter, a receiver, or both a transmitter and a receiver, or a unit or device that is configured both for transmission and reception. In other embodiments, the transceivers 616 and 626 may be capable of transmitting and receiving signals or data directly.

Figure 7:
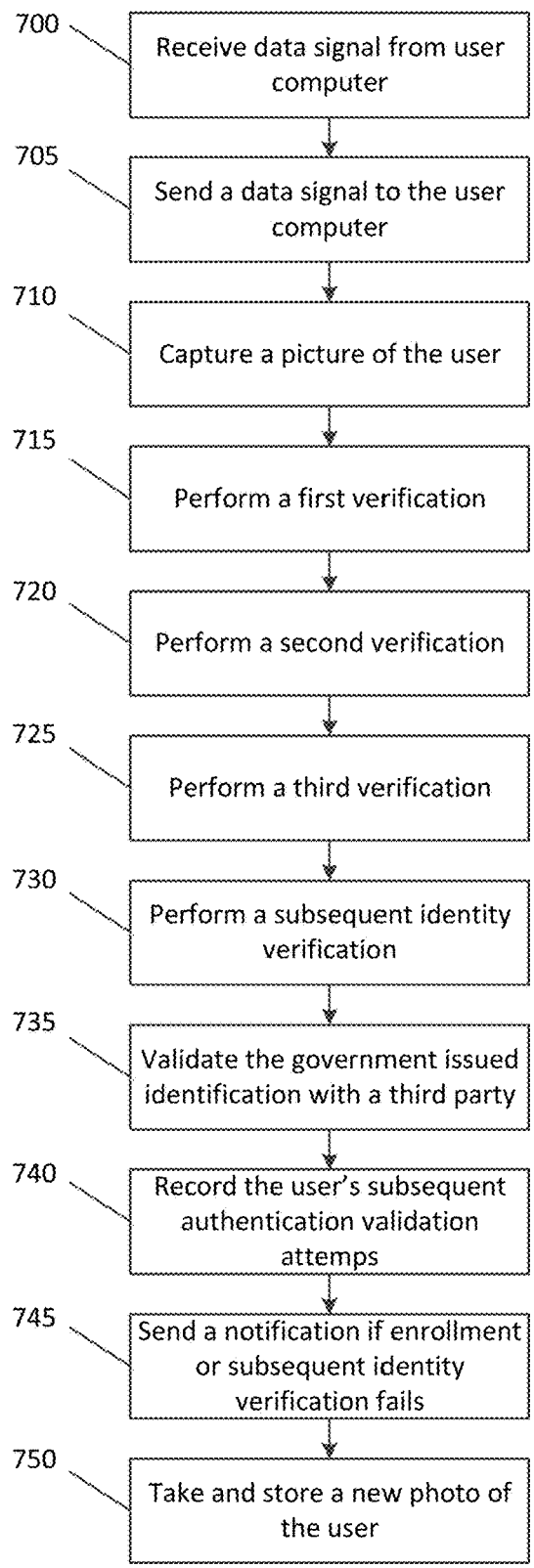
FIG. 7 illustrates a flow diagram according to one embodiment.

FIG. 7 illustrates a flow diagram according to certain embodiments. In step 700, a server may receive a data signal from a user computer for a user request to schedule an enrollment session with a remote live person. In step 705, the server may, based on the availability of the remote live person and the enrollment session, send a data signal to the user computer, requesting access to at least one of a webcam, microphone, and remote desktop sharing software available on the user computer. In step 710, the server may capture a picture of the user via the webcam. In step 715, the server may perform a first verification by comparing the user's government issued identification against the captured picture. In step 720, the server may perform a second verification by prompting the user to provide answers to a series of knowledge based authentication questions. In certain embodiments, the knowledge based authentication questions may be derived from public records or a third party source, and the user may be observed by a remote person via the webcam. In step 725, the server may perform a third verification by recording a keystroke sample entered by the user in response to prompting the user to type a text passage. In step 730, the server may perform a subsequent identity verification of the user based on at least one of the captured photo, the user's government issued identification, answers to a series of knowledge based authentication questions, and the user's keystroke sample.

In step 735, the server may validate the government issued identification with a third party identification validation service. In step 740, the server may record the user's subsequent authentication validation attempts. In step 745, the server may send a notification in the event that the enrollment or the subsequent identity verification fails. In certain embodiments, the notification may be sent by email or a short message service (SMS) alert. In step 750, the server may take and store a new photo of the user for each subsequent identity verification of the user.

Figure 8:
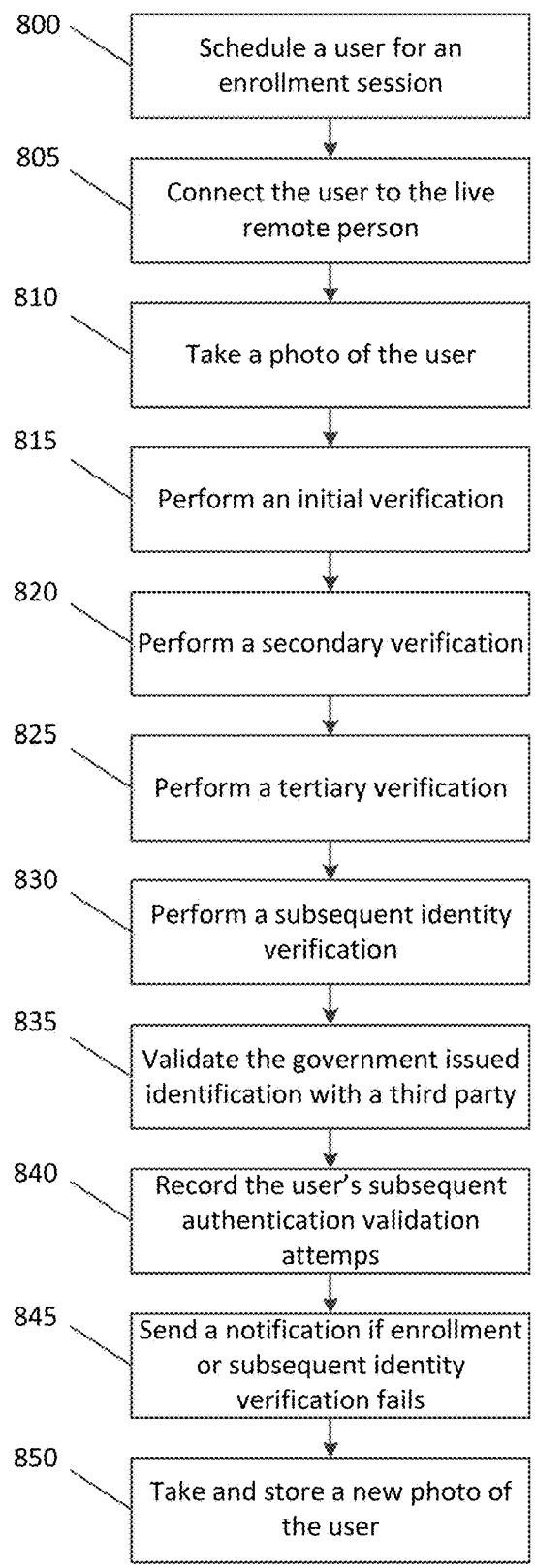
FIG. 8 illustrates another flow diagram according to certain embodiments.

FIG. 8 illustrates a flow diagram according to certain embodiments. In step 800, a server may schedule a user for an enrollment session with a live remote person. In step 805, the server may, based on the scheduled enrollment session, connect the user to the live remote person via at least one of a webcam, microphone, and remote desktop sharing software. In step 810, the server may take a photo of the user via the user's webcam. In step 815, the server may perform an initial verification by validating the user's government issued identification with the photo taken of the user. In step 820, the server may perform a secondary verification while being observed by the remote person by prompting the user to provide answers to a series of knowledge based authentication questions. In certain embodiments, the knowledge based authentication questions may be derived from public records or a third party source. In step 825, the server may perform a tertiary verification by recording a keystroke sample of the user in response to prompts to the user to type a text passage. In step 830, the server may perform a subsequent identity verification of the user based on at least one of the photo of the user, the user's government issued identification, the answers to the series of knowledge based authentication questions, and the user's keystroke sample.

In step 835, the server may validate the government issued identification with a third party identification validation service. In step 840, the server may record the user's subsequent authentication validation attempts. In step 845, the server may send a notification in the event that the enrollment or the subsequent identity verification fails. In certain embodiments, the notification may be sent by email or a short message service (SMS) alert. In step 850, the server may take and store a new photo of the user for each subsequent identity verification of the user.

In certain embodiments, the proctor may remotely authorize the release of the knowledge based questions and keystroke enrollment of the user. In other embodiments, the platform may be extensible to offer many different forms of authentication methods to be interchanged as newer and improved methods become available. In some embodiments, when the initial enrollment and any subsequent follow-ups are performed, the system may store meta-data. The stored meta-data may include an IP-address, connection duration, and connection frequency. In other embodiments, the meta-data may be used for behavioral analysis and comparison.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A server comprising at least one processor, and at least one memory including computer program code, wherein the at least one memory and the computer program code are configured to, with the at least one processor, cause the server at least to:
   receive a data signal from a user computer for a user request to schedule an enrollment session with a remote live person;
   based on the availability of the remote live person and the enrollment session, send a data signal to the user computer, requesting access to at least one of a webcam, microphone, and remote desktop sharing software available on the user computer;
   capture a picture of the user via the webcam;
   prior to the user being connected to the remote live person,
      perform a first verification by comparing the user's government issued identification against the captured picture;
      perform a second verification by prompting the user to provide answers to a series of knowledge based authentication questions, wherein the user is observed by a remote person via the webcam; and
      perform a third verification by recording a keystroke sample entered by the user in response to prompting the user to type a text passage;
   connect the user to the remote live person after capturing the picture of the user, and performing the first verification, the second verification, and third verification; and
   after the user is connected to the remote live person, perform a subsequent identity verification of the user based on at least one of the captured photo, the user's government issued identification, answers to a series of knowledge based authentication questions, and the user's keystroke sample,
   wherein, after the user is connected to the remote live person and after the first verification, the second verification, and the third verification, the subsequent identity verification of the user is performed a plurality of times, and
   wherein the at least one memory and the computer program code are further configured to, with the at least one processor, cause the server at least to create a user activity timeline using an initial enrollment as a beginning, and showing all the plurality of subsequent identity verifications as subsequent points on the timeline, wherein the timeline shows specific times, before and after the user is connected to the remote live person, when the user has successfully completed each verification.

2. The server according to claim 1, wherein the at least one memory and the computer program code are further configured to, with the at least one processor, cause the server at least to validate the government issued identification with a third party identification validation service.

3. The server according to claim 1, wherein the at least one memory and the computer program code are further configured to, with the at least one processor, cause the server at least to record the user's subsequent authentication validation attempts.

4. The server according to claim 1, wherein the at least one memory and the computer program code are further configured to, with the at least one processor, cause the server at least to send a notification in the event that the enrollment or the subsequent identity verification fails.

5. The server according to claim 4, wherein the notification comprises an email or short message service alert.

6. The server according to claim 1, wherein the series of knowledge based authentication questions is derived from public records or a third party source.

7. The server according to claim 1, wherein the at least one memory and the computer program code are further configured to, with the at least one processor, cause the server at least to take and store a new photo of the user for each subsequent identity verification of the user.

8. An apparatus, comprising:
   at least one processor; and
   at least one memory including computer program code,
   wherein the at least one memory and the computer program code are configured, with the at least one processor, to cause the apparatus at least to
   schedule a user for an enrollment session with a remote live person;
   based on the scheduled enrollment session, connect the user to the live remote person via at least one of a webcam, microphone, and remote desktop sharing software;
   take a photo of the user via the user's webcam;
   prior to the user being connected to the remote live person,
      perform an initial verification by validating the user's government issued identification with the photo taken of the user;
      perform a secondary verification while being observed by the remote person by prompting the user to provide answers to a series of knowledge based authentication questions; and
      perform a tertiary verification by recording a keystroke sample of the user in response to prompts to the user to type a text passage;
   connect the user to the remote live person after taking the photo of the user, and performing the first verification, the second verification, and the third verification; and after the user is connected to the remote live person, perform a subsequent identity verification of the user based on at least one of the photo of the user, the user's government issued identification, the answers to the series of knowledge based authentication questions, and the user's keystroke sample, wherein, after the user is connected to the remote live person and after the initial verification, the secondary verification, and the tertiary verification, the subsequent identity verification of the user is performed a plurality of times, and wherein the at least one memory and the computer program code are further configured to, with the at least one processor, cause the apparatus at least to create a user activity timeline using an initial enrollment as a beginning, and showing all the plurality of subsequent identity verifications as subsequent points on the timeline, wherein the timeline shows specific times, before and after the user is connected to the remote live person, when the user has successfully completed each verification.

9. The apparatus according to claim 8, wherein the at least one memory and the computer program code are further configured, with the at least one processor, to cause the apparatus at least to validate the government issued identification with a third party identification validation service.

10. The apparatus according to claim 8, wherein the at least one memory and the computer program code are further configured, with the at least one processor, to cause the apparatus at least to record the user's subsequent authentication validation attempts.

11. The apparatus according to claim 8, wherein the at least one memory and the computer program code are further configured, with the at least one processor, to cause the apparatus at least to send a notification in the event that the enrollment or the subsequent identity verification fails.

12. The apparatus according to claim 11, wherein the notification comprises an email or short message service alert.

13. The apparatus according to claim 8, wherein the series of knowledge based authentication questions is derived from public records or a third party source.

14. The apparatus according to claim 8, wherein the at least one memory and the computer program code are further configured, with the at least one processor, to cause the apparatus at least to take and store a new photo of the user for each subsequent identity verification of the user.

15. A computer program, embodied on a non-transitory computer readable medium, the computer program, when executed by a processor, causes the processor to:
schedule a user for an enrollment session with a remote live person;
based on the scheduled enrollment session, connect the user to the live remote person via at least one of a webcam, microphone, and remote desktop sharing software;
take a photo of the user via the user's webcam;

prior to the user being connected to the remote live person,
perform an initial verification by validating the user's government issued identification with the photo taken of the user;
perform a secondary verification while being observed by the remote person by prompting the user to provide answers to a series of knowledge based authentication questions; and
perform a tertiary verification by recording a keystroke sample of the user in response to prompts to the user to type a text passage;
connect the user to the remote live person after taking the photo of the user, and performing the first verification, the second verification, and the third verification; and
after the user is connected to the remote live person, perform a subsequent identity verification of the user based on at least one of the photo of the user, the user's government issued identification, the answers to the series of knowledge based authentication questions, and the user's keystroke sample,
wherein, after the user is connected to the remote live person and after the initial verification, the secondary verification, and the tertiary verification, the subsequent identity verification of the user is performed a plurality of times, and
wherein the computer program, when executed by a processor, further causes the processor to create a user activity timeline using an initial enrollment as a beginning, and showing all the plurality of subsequent identity verifications as subsequent points on the timeline, wherein the timeline shows specific times, before and after the user is connected to the remote live person, when the user has successfully completed each verification.

16. The computer program according to claim 15, wherein the computer program, when executed by a processor, further causes the processor to validate the government issued identification with a third party identification validation service.

17. The computer program according to claim 15, wherein the computer program, when executed by a processor, further causes the processor to record the user's subsequent authentication validation attempts.

18. The computer program according to claim 15, wherein the computer program, when executed by a processor, further causes the processor to send a notification in the event that the enrollment or the subsequent identity verification fails.

19. The computer program according to claim 18, wherein the notification comprises an email or short message service alert.

20. The computer program according to claim 15, wherein the series of knowledge based authentication questions is derived from public records or a third party source.

* * * * *